United States Patent [19]

Velling et al.

[11] 4,163,464
[45] Aug. 7, 1979

[54] ARRANGEMENT FOR FILLING A VESSEL WHICH IS TO BE PUT UNDER HIGH PRESSURE, WITH FREELY FLOWING SOLIDS

[75] Inventors: Günter Velling, Bornheim-Hersel; Wolfhard Ruddeck, Wuppertal, both of Fed. Rep. of Germany

[73] Assignee: Rheinische Braunkohlenwerke AG, Fed. Rep. of Germany

[21] Appl. No.: 874,670

[22] Filed: Feb. 2, 1978

[30] Foreign Application Priority Data

Feb. 11, 1977 [DE] Fed. Rep. of Germany ....... 2705763

[51] Int. Cl.$^2$ .................. B65B 31/00; B65B 1/30; B65B 57/14
[52] U.S. Cl. .................................... 141/198; 141/392; 141/DIG. 1; 222/331; 222/481
[58] Field of Search ......... 141/198, 374, 392, DIG. 1; 222/331, 431, 432, 433, 481

[56] References Cited

U.S. PATENT DOCUMENTS

| 65,335 | 6/1867 | Brinkerhoff | 222/432 |
| 3,804,136 | 4/1974 | Thomson | 141/392 |

FOREIGN PATENT DOCUMENTS

| 2451261 | 5/1975 | Fed. Rep. of Germany | 141/198 |
| 236610 | 7/1945 | Switzerland | 222/432 |

*Primary Examiner*—Richard R. Stearns
*Attorney, Agent, or Firm*—Seidel, Gonda, Goldhammer & Panitch

[57] ABSTRACT

The present specification describes and claims an arrangement for filling a vessel which is to be put under high pressure, with freely flowing solids from a storage vessel which is under normal pressure. The arrangement comprises a supply line extending between the storage vessel and the pressure vessel with a pressure sealing valve which can be tightly closed to counter the working pressure in the pressure vessel, and a shut-off valve suitable for sealing the storage vessel, arranged one behind the other in the supply line. The part of the supply line within the pressure vessel has at least one aperture in its wall and extends within a tube which also has an aperture or apertures, the tube and the supply line being so arranged that relative rotational movement there between opens and closes the aperture in the supply line. Thus, when the pressure vessel is full, the solids block off the supply line which is also full. The tube can then be rotated to open the aperture to allow the supply line to empty into the pressure vessel, the shut-off valve being closed at the same time. Subsequently the pressure sealing valve can be closed and the pressure vessel pressurized.

3 Claims, 1 Drawing Figure

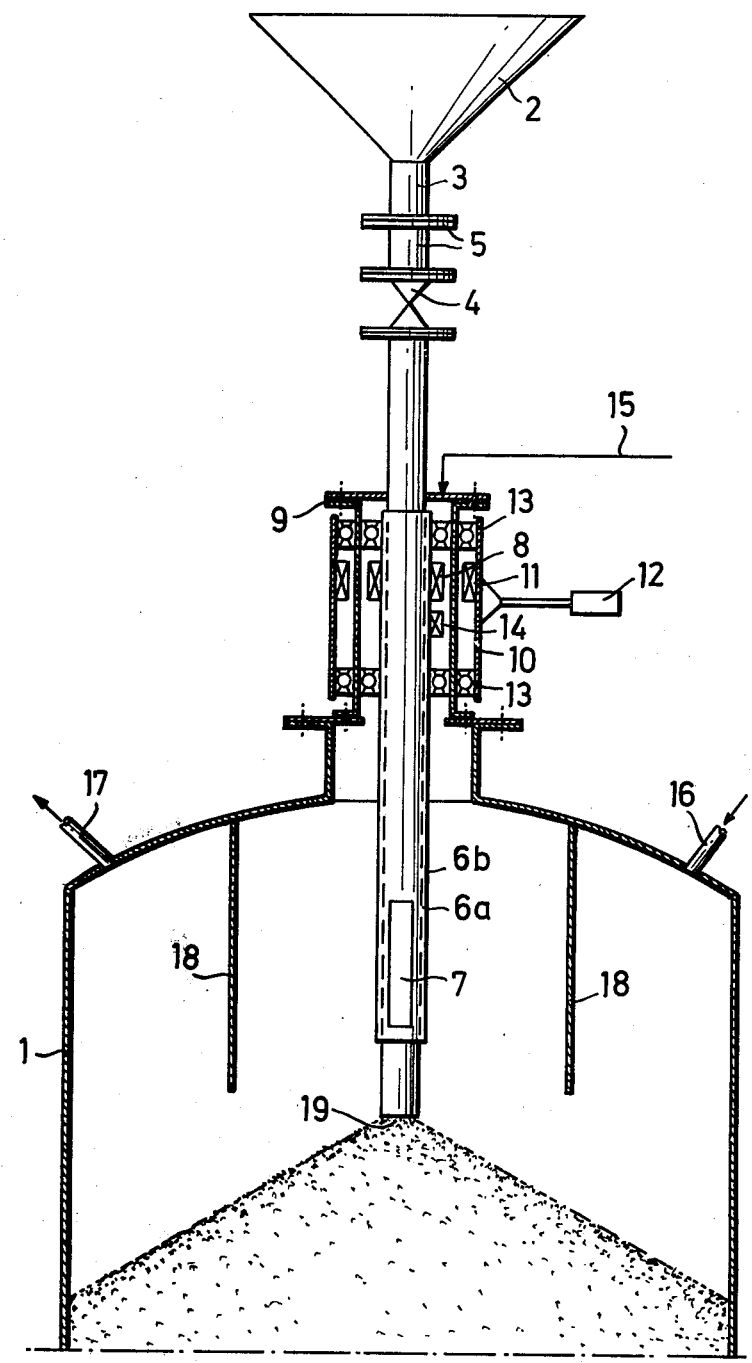

ARRANGEMENT FOR FILLING A VESSEL WHICH IS TO BE PUT UNDER HIGH PRESSURE, WITH FREELY FLOWING SOLIDS

The present invention relates to an arrangement for use in filling a vessel, which is to be put under high pressure, with freely flowing solids, the filling and pressurizing processes being effected periodically.

In the development of new methods of, for example, pressurized carburetion, it is necessary to introduce solids continuously into the reaction chamber, which is under high pressure, from a storage vessel. In so doing this it is imperative that no gases escape from the reaction chamber, e.g., in a carbon carburetor. However, the conventional elements for shutting off the supply of solids cannot be sealed in a gas-tight manner during operation, since the solids place themselves between the sealing faces of the shut-off valves and thus prevent complete sealing.

It has therefore been proposed to place in front of the shut-off valves pressure-resistant vessels which are periodically filled with the solids from a storage vessel and are then put under the pressure which prevails in the reactor, whereupon the solids are introduced into the reactor. This presupposes that, at the time when the pressure-resistant vessel is filled, the shut-off valve can be sealed in a gas-tight manner between this pressure-resistant vessel and the reactor and, at the time of emptying the shut-off valve can be sealed in a gas-tight manner between the pressure-resistant vessel and the storage vessel, i.e., there are no solids in the shut-off valves. In the first-mentioned instance, this may be achieved, for example, by completely emptying the vessel into the reactor. However, after the filling process there are still some solids, which generally prevent gas-tight sealing, in the shut-off valve in the line for supplying the solids from the storage vessel.

An aim of the present invention is therefore to provide an arrangement which enables the shut-off valve to close in a gas-tight manner between the pressure-resistant vessel and the storage vessel after the pressure-resistant vessel has been filled.

According to the present invention, there is provided an arrangement for filling a vessel, which is to be put under high pressure, with freely flowing solids from a storage vessel, which is under normal pressure, characterized by a line from the storage vessel to the pressure-resistant vessel, this line containing one above the other a device which can be tightly sealed counter to the working pressure and a device which is suitable for sealing the storage vessel, and a device which is connected to the mouth of the line opening into the pressurized vessel and comprises a double tube having one or a plurality of substantially identical apertures in the two tubes, one of the tubes being disposed relative to the other so that the apertures in both tubes can be wholly or partially covered one with the other by rotating at least one of the tubes, so that a passage is made for the solids located in the inner tube.

During the normal filling process, the said passage may be closed, whereby it is merely necessary to bring the two tubes into the appropriate angular position relative to each other so that the respective aperture in one tube is covered by one of the surfaces of the other tube. The arrangement according to the invention is suitable for all kinds of freely flowing solids, either in powder form or lump form, e.g., for carbon or for lime.

Both the storage vessel and the pressure-resistant vessel may be any design. The connecting line should have such a diameter that the solid can flow freely therethrough.

The pressures being applied in the pressure-resistant vessel and in the reactor may have any value, e.g., 300 bars or more. The two vessels must of course be designed for the pressure selected. The conventional shut-off valves such as ball-cocks, sliding or conical seals, may be chosen for the pressure-tight sealing device, whose open cross-section in the open state is to be of such dimensions that the free flow of the solid is not hindered. Rotary, diaphragm or plate slides of conventional construction may be chosen, for example for the device for sealing the storage vessel, the shut-off valve not having to be designed for high pressures. The two valves will generally be positioned closely one behind the other so as to keep the line volume between them as small as possible.

The double tube is advantageously to be designed so that the outer tube is only slightly larger than the supply line so as not to hinder the free fall of the solids. Diameters will generally be chosen between substantially 5 and 50 cm, the choice being dependent upon the form and amount of the solids being introduced. The length of the double tube is consequently also dependent upon the shape of the pressure-resistant vessel. This length has to be selected so that there is enough free volume above the bulk area of the solids in the pressure-resistant vessel to be able to accommodate the solids remaining in the supply line after filling.

The double tube will generally not be made longer than 1 m. The internal gap in the double tube will generally be kept narrow, but it should be selected so that solid portions which have entered the double tube do not remain therein, but drop down again. If desired, this may be advanced by introducing a rinsing gas into the gap. The outer tube may also become wider at the bottom so as to be rather conical in design, whereby slight inclinations, e.g. of 1°–5°, are sufficient. The inner tube may also of course be slightly retracted towards the bottom so as to form the gap which extends downwards.

The inner tube will generally be fixed and the outer tube will be rotatably disposed. The outer tube may rotate into the desired position in a conventional manner. The rotation will advantageously be effected by means of the transmission of magnetic force. To check the position of the aperture, one may use, for example, a device comprising a signal magnet, firmly attached to the outer tube, and a switch or magnet disposed outside the device. If the outer tube is located in the desired position, this is indicated by way of the switch or magnet outside the pressurized vessel.

The shape, size and number of the apertures in the tubes may be chosen as desired. It must just be ensured that the free cross-section permits a free flow of the solids and that an adequate covering of the aperture in the inner tube is possible with the wall of the outer tube so as to seal the aperture. Generally one or two rectangular apertures are chosen, substantially up to 30 cm high. The outer tube is advantageously only made so long that a covering of the apertures is ensured, while the inner tube can extend further into the pressure-resistant vessel.

The devices for emptying the pressure-resistant vessel and for supplying the pressurized gases as well as for releasing these gases may be conventional. So as to obtain a continuous introduction of the solids under pressure into the reaction chamber, e.g., a carbon carburetor, a further pressurized vessel may be disposed, for example, between the pressure-resistant vessel and the reaction chamber, this additional vessel being filled up periodically as a second vessel and the flow being channelled into the reaction chamber continuously from this additional vessel.

The present invention will now be further described by way of example with reference to the accompanying drawing in which one embodiment of the present invention is shown.

In the accompanying drawing a pressure resistant vessel 1 is connected to a storage vessel 2 by a supply line 3. A pressure sealing device 4 for use in sealing the vessel 1 in a gas-tight manner and a shut-off valve 5 for use in merely blocking the flow of material from the storage vessel 2, are located in the supply line 3. Part 6a of supply line 3, extends into pressure vessel 1 and has an aperture in its wall. This aperture can be closed off by an outer tube 6b which is concentrically arranged with respect to part 6a and rotatable with respect thereto. Outer tube 6b also has an aperture 7 in its wall and by rotating outer tube 6b the apertures in 6a/6b can be aligned.

The rotatable outer tube 6b is supported by bearings 13 within an anti magnetic pressure-resistant cylindrical extension 9 of pressure vessel 1 and magnets 8 are mounted on outer tube 6b within extension 9. Mounted on the outside of extension 9 by bearings 13, is an external ring 10 which carries magnets 11. By rotating external ring 10 about the longitudinal axis of supply line 3, by means of drive 12, the outer tube 6b is also rotated due to the force between magnets 8 and 11. A signal magnet 14 also mounted on outer tube 6b acts upon an externally located switch (not shown) to check when outer tube 6b has reached a specific position. Line 15 enables a rinsing gas to be introduced to keep the gap between 6a and 6b, and the bearings free.

Located on the pressure vessel 1 are lines 16 and 17. Line 16 together with appropriate elements (not shown) enables the gas selected as the pressure gas to be introduced into the pressure vessel 1 and line 17, together with appropriate elements (not shown), serves to relieve the pressure within the vessel 1 when desired. The pressure vessel 1 is further provided with a pressure-resistant blocking device (not shown) having an adequately free cross-section for the removal of material from vessel 1. Plates 18 within the pressure vessel 1 help to keep the space around the tubes 6a/6b as free from dust as possible. These plates 18 can of course be omitted when a dust free product is being handled.

In operation and after the pressure vessel 1 has been relieved, aperture 7 being closed, sealing device 4 and shut-off valve 5 are opened so that the solids material can flow from storage vessel 2 to pressure vessel 1 via supply line 3 and its lower aperture 19. Once the level of the solids material has attained the illustrated position, i.e., the filled state, the flow of solids automatically ceases with supply line 3 full of the material. By operating shut-off valve 5 and rotating outer tube 6b to at least partially open aperture 7, the flow of material from storage vessel 2 is maintained stopped and the supply line empties into vessel 1 via aperture 7. The pressure sealing device 4 can then be closed and vessel 1 pressurized.

We claim:

1. An arrangement for filling a vessel which is to be put under high pressure, with freely flowing solids from a storage vessel which is under normal pressure, comprising a supply line extending from the storage vessel to the pressure vessel and having an open-ended part extending into the pressure vessel, a pressure sealing valve which can be tightly closed to counter the working pressure in the pressure vessel, a shut-off valve which is suitable for sealing the storage vessel, both valves being arranged one behind the other in the supply line, and a tube which extends over said part of the supply line within the pressure vessel, said part of the supply line and said tube each having at least one aperture in their walls, the tube and said supply line being arranged so that relative rotational movement therebetween opens and closes the aperture or apertures in said supply line.

2. An arrangement according to claim 1, including magnetic means for transmission of a drive force to rotate the tube about the supply line.

3. An arrangement according to claim 2, in which at least one magnet is provided on said tube, a further magnet or magnets being provided on a member mounted externally of the pressure vessel, said member being mounted for rotation about the supply line, rotation of said member by said drive force causing said tube to rotate due to the interaction of magnetic forces.

* * * * *